United States Patent
Wojtowicz

(10) Patent No.: US 7,693,178 B2
(45) Date of Patent: Apr. 6, 2010

(54) SMALL FORM FACTOR, PLUGGABLE ONU

(75) Inventor: Jaroslaw Wojtowicz, Santa Rosa, CA (US)

(73) Assignee: Teknovus, Inc., Petaluma, CA (US)

( * ) Notice: Subject to any disclaimer, the term of this patent is extended or adjusted under 35 U.S.C. 154(b) by 572 days.

(21) Appl. No.: 11/644,562

(22) Filed: Dec. 21, 2006

(65) Prior Publication Data

US 2007/0153823 A1    Jul. 5, 2007

Related U.S. Application Data

(60) Provisional application No. 60/755,894, filed on Dec. 30, 2005.

(51) Int. Cl.
*H04L 3/00* (2006.01)
*H04L 1/00* (2006.01)

(52) U.S. Cl. ..................... 370/463; 370/249

(58) Field of Classification Search .............. 370/463, 370/249
See application file for complete search history.

(56) References Cited

U.S. PATENT DOCUMENTS

| | | | |
|---|---|---|---|
| 6,343,019 B1 * | 1/2002 | Jiang et al. | 361/761 |
| 6,735,709 B1 | 5/2004 | Lee | |
| 2002/0129215 A1 | 9/2002 | Yoo | |
| 2004/0081196 A1 * | 4/2004 | Elliott | 370/465 |
| 2005/0169632 A1 * | 8/2005 | Song et al. | 398/72 |
| 2005/0174878 A1 | 8/2005 | Osaka | |
| 2005/0259589 A1 * | 11/2005 | Rozmovits et al. | 370/249 |
| 2006/0257149 A1 * | 11/2006 | Hirth et al. | 398/72 |
| 2007/0116466 A1 * | 5/2007 | Gewirtzman et al. | 398/71 |
| 2008/0159744 A1 * | 7/2008 | Soto et al. | 398/115 |
| 2008/0186878 A1 * | 8/2008 | Zheng | 370/254 |

* cited by examiner

*Primary Examiner*—Derrick W Ferris
*Assistant Examiner*—Angel Brockman
(74) *Attorney, Agent, or Firm*—Park, Vaughan & Fleming LLP; Shun Yao

(57) ABSTRACT

The present invention provides a small form factor, pluggable ONU, which includes a bi-directional optical transceiver configured to transmit optical signals to and receive optical signals from an OLT. The ONU further includes an ONU chip coupled to the optical transceiver and configured to communicate with the OLT. Also included is a pluggable interface configured to electrically interface between the ONU chip and a piece of subscriber premise equipment (SPE). The ONU includes a power management module to provide power to the ONU chip and the optical transceiver, using power delivered from the SPE through the pluggable interface. The ONU is enclosed a small form factor enclosure, thereby allowing the pluggable ONU to be directly plugged into the SPE and providing an Ethernet Passive Optical Network (EPON) uplink to the SPE without requiring an separate power supply.

17 Claims, 3 Drawing Sheets

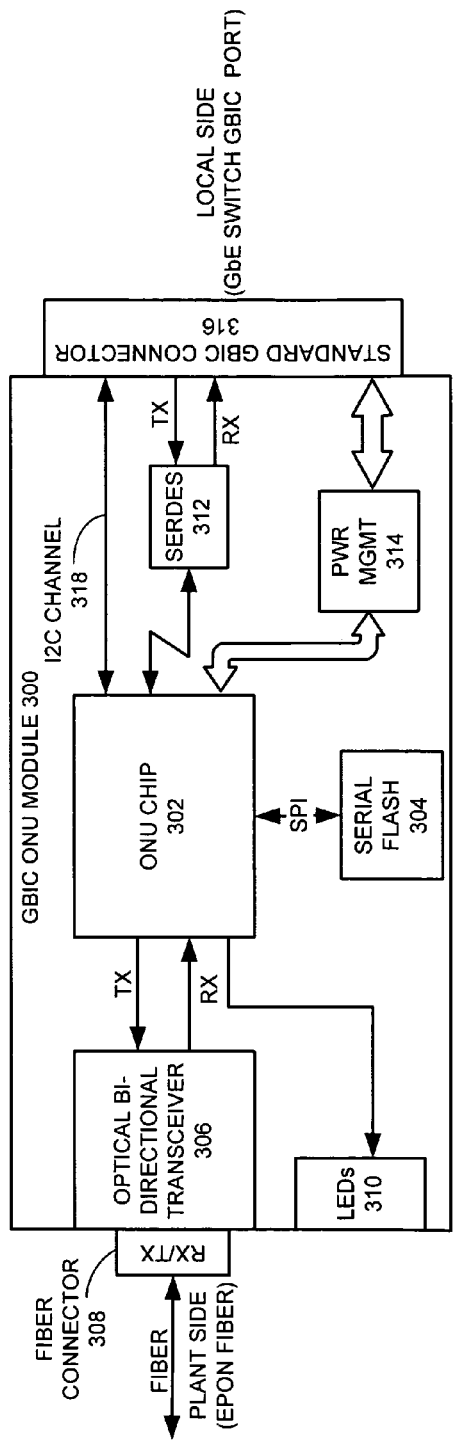
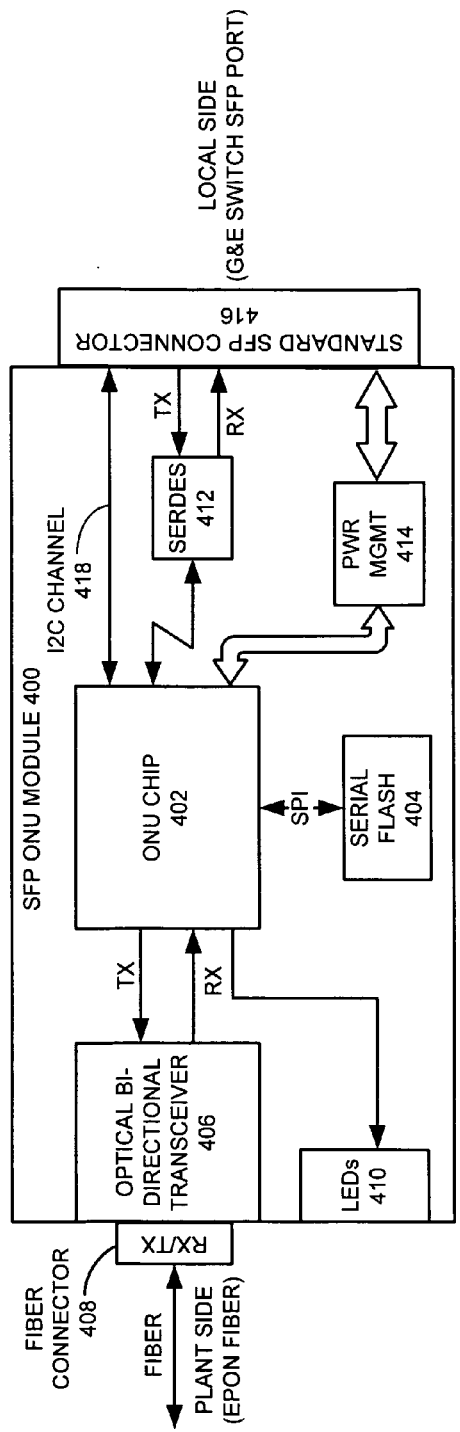
FIG. 3
FIG. 4

SMALL FORM FACTOR, PLUGGABLE ONU

RELATED APPLICATION

This application hereby claims priority under 35 U.S.C. §119 to the following provisional patent application: U.S. Provisional Patent Application No. 60/755,894 filed on 30 Dec. 2005, entitled "EPON ONU Integrated in GBIC Module," by inventor Jaroslaw Wojtowicz.

BACKGROUND

1. Field of the Invention

The present invention relates to the design of Ethernet passive optical networks. More specifically, the present invention relates to the design of a small form factor, pluggable optical network unit (ONU).

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs). The OLT generally resides in the central office and couples the optical access network to a metro backbone, which can be an external network belonging to, for example, an Internet Service Provider (ISP) or a local exchange carrier. An ONU can reside either at the curb and provide broadband voice, data, and video services. ONUs are coupled to a one-by-N (1×N) passive optical coupler, where N is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONU, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

In conventional EPON configurations, an ONU is typically a stand-alone device and requires a separate power supply. The ONU generally resides away from the subscriber's premise, for example, at the curb side. An optical or electrical communication link is necessary to couple the ONU with the subscriber's network through a subscriber premise equipment (SPE) which can be, for example, a Gigabit Ethernet (GbE) switch.

This configuration is not ideal, because the additional communication link and associated hardware makes it costly for the subscriber to upgrade from a traditional access network to EPON. Hence, what is needed is an ONU that can obviate this communication link and facilitate cost-effective upgrades to EPON.

SUMMARY

One embodiment of the present invention provides a small form factor, pluggable optical network unit (ONU). The ONU includes a bi-directional optical transceiver configured to transmit optical signals to and receive optical signals from an optical line terminal (OLT). The ONU further includes an ONU chip coupled to the optical transceiver and configured to communicate with the OLT, through the optical transceiver. Also included within the ONU is a pluggable interface coupled to the ONU chip and configured to electrically interface between the ONU chip and a piece of subscriber premise equipment (SPE), whereby the pluggable interface can be directly plugged into the SPE. In addition, the ONU includes a power management module configured to provide power to the ONU chip and the optical transceiver, using power delivered from the SPE through the pluggable interface. The optical transceiver, the ONU chip, the power management module, and the serial interface are contained in a small form factor enclosure, thereby allowing the pluggable ONU to be directly plugged into the SPE and providing an Ethernet Passive Optical Network (EPON) uplink to the SPE without requiring an separate power supply.

In a variation on this embodiment, the enclosure has a form factor that is substantially the same as a Gigabit Interface Converter (GBIC) transceiver; and the pluggable interface is a GBIC interface which can be plugged into a GBIC port on the SPE.

In a variation on this embodiment, the enclosure has a form factor that is substantially the same as a small form factor pluggable (SFP) transceiver; and wherein the pluggable interface is a SFP interface which can be plugged into an SFP port on the SPE.

In a variation on this embodiment, the enclosure has a form factor that is substantially the same as a 10 Gigabit Small Form Factor Pluggable (XFP) transceiver; and the pluggable interface is an XFP interface which can be plugged into an XFP port on the SPE.

In a variation on this embodiment, the ONU chip is configured to perform network management through an in-band management channel between the ONU and the OLT.

In a variation on this embodiment, the ONU further comprises an inter-integrated circuit (I2C) bus which is coupled to the ONU chip and the pluggable interface. Furthermore, the ONU chip is configured to allow the SPE to manage the ONU through the I2C bus.

In a variation on this embodiment, the bidirectional optical transceiver is a pluggable transceiver and is configured to transmit optical signals into and receive optical signals from a multi-mode or a single-mode optical fiber.

In a variation on this embodiment, the ONU further comprises a serializer/deserializer (SERDES) module which is coupled between the pluggable interface and the ONU chip, thereby facilitating serial communication through the pluggable interface.

In a variation on this embodiment, the ONU chip includes a SERDES, thereby facilitating serial communication through the pluggable interface.

In a variation on this embodiment, the ONU chip includes a printed circuit board (PCB). In addition, the ONU chip includes a die directly attached on the PCB without conventional chip packaging.

BRIEF DESCRIPTION OF THE FIGURES

FIG. 3 illustrates an exemplary pluggable ONU module with a GBIC form factor in accordance with an embodiment of the present invention.

FIG. 4 illustrates an exemplary pluggable ONU module with an SFP form factor in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application specific integrated circuits (ASICs), field-programmable gate arrays (FPGAs), semiconductor memories, magnetic and optical storage devices such as disk drives, magnetic tape, and CDs (compact discs) and DVDs (digital versatile discs or digital video discs).

Passive Optical Network Topology

Figure 1:
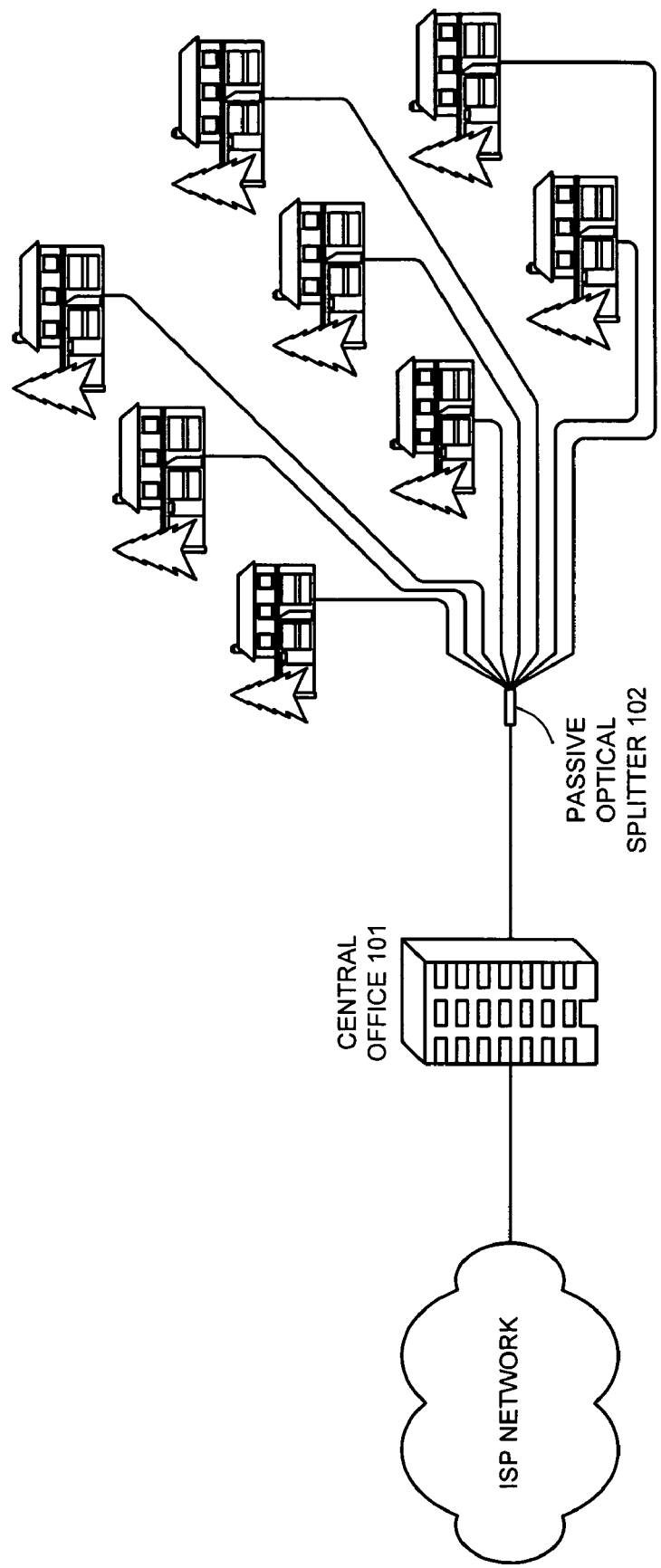
FIG. 1 illustrates an EPON wherein a central office and a number of subscribers are coupled through optical fibers and a passive optical splitter (prior art).

FIG. 1 illustrates a passive optical network including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

Conventional EPON Configuration

Figure 2A:
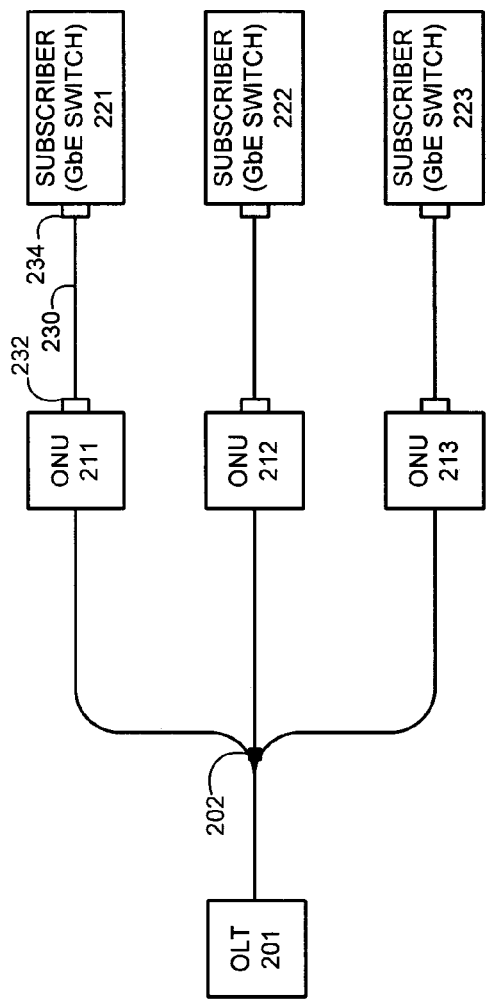
FIG. 2A illustrates a conventional EPON configuration wherein the ONU's reside away from the subscriber premises (prior art).

FIG. 2A illustrates a conventional EPON configuration wherein the ONU's reside away from subscriber premises (prior art). During normal operation, an OLT 201 broadcasts downstream data to ONUs 211, 212, and 213. While all ONUs receive the same copy of downstream data, each ONU selectively forwards only the data destined to its corresponding subscribers, which in this example are subscribers 221, 222, and 223, respectively. Note that in this example each subscriber is equipped with a Gigabit Ethernet (GbE) switch which communicates with the ONU. In general, on the local side, an ONU is in communication with a piece of subscriber premise equipment (SPE), which can include a GbE switch and other telecommunication equipment.

The downstream optical signal is divided by an optical splitter 202. Optical splitter 202 also functions as a combiner for upstream signals from different ONUs. Each ONU receives the downstream optical signals and retrieves data which is destined to its corresponding subscriber based on the LLID of each packet. Since an ONU is typically located away from the subscriber's network equipment, an additional communication link is required to couple the ONU to the subscriber.

For example, ONU 211 is coupled to subscriber 221 through a communication link 230. Communication link 230 can be an optical link, such as an optical fiber, or an electrical link, such as a copper cable. In addition, ONU 211 needs a transceiver interface 232 to transmit to and receive signals from subscriber 221. Similarly, subscriber 221 needs a transceiver interface 234 to communicate with ONU 211. Communication link 230 and interfaces 232 and 234 inevitably add to the cost of the network infrastructure. The additional hardware also increases the costs of upgrading from a conventional access network to EPON for the customer.

Small Form Factor, Pluggable ONU

Figure 2B:
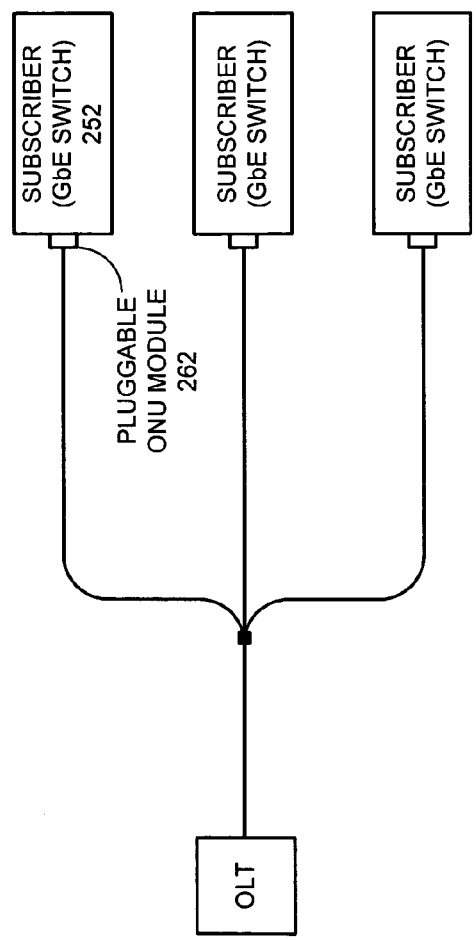
FIG. 2B illustrates an EPON configuration which employs pluggable ONU modules in accordance within one embodiment of the present invention.

To overcome these issues, embodiments of the present invention provide a pluggable ONU module which can be directly plugged into a subscriber's switch, thereby significantly reducing the complexity and costs of EPON deployment. FIG. 2B illustrates an EPON configuration which employs pluggable ONU modules in accordance within one embodiment of the present invention. In this embodiment, an ONU is a small form factor, pluggable ONU module. For example, ONU module 262 is directly plugged into a port on subscriber GbE switch 252. This configuration obviates the extra transceiver interfaces and the communication link between ONU and subscriber. As a result, a customer can easily upgrade to EPON by plugging the ONU module into an existing switch and inserting the EPON optical fiber into the ONU module.

The connection interface between a pluggable ONU module and the subscriber's switch can be based on any open-standard or proprietary format. In one embodiment, the ONU module complies with the Gigabit Interface Converter (GBIC) standard, which is a standard for transceivers commonly used with GbE and fiber channel. GBIC defines a hot swappable electrical interface and can support a wide range of physical media, from copper to long-wavelength single-mode optical fiber, at lengths up to hundreds of kilometers. The GBIC specification [online, retrieved on 18 Dec. 2006] is available at <URL: http://www.optoictech.com/Datasheet/GBC/GBIC_MSA.pdf>, which is herein incorporated by reference in its entirety. In further embodiments, the ONU module can have even smaller form factors. For example, the ONU module can comply with the Small Form-factor Pluggable (SFP) standard, which is designed after the GBIC standard and allows a greater port density due to the transceiver's small physical size. The SFP specification [online, retrieved on 18 Dec. 2006] is available at <URL: http://www.scheltо.com/SFP/SFP%20MSA.pdf>, which is herein incorporated by reference in its entirety. In addition, the inventive ONU module can also comply with the 10 Gigabit Small Form Factor Pluggable (XFP) standard, which defines a form factor similar to SFP and supports a data rate up to 10 Gbps.

Note that although the examples herein use GbE switches as the exemplary subscriber premise equipment, embodiments of the present invention can be readily applied to a variety of network equipment, such as routers, switches, crossconnects, multiple-layer switches, or central office terminals. In general, the inventive pluggable ONU modules can be plugged into any network equipment which provides a compatible interface.

FIG. 3 illustrates an exemplary pluggable ONU module with a GBIC form factor in accordance with an embodiment of the present invention. A GBIC ONU module 300 includes a fiber connector 308 for coupling to an optical fiber on the plant side, i.e., the EPON fiber. Through connector 308, an optical bi-directional transceiver 306 transmits optical signals to and receive signals from the optical fiber. Transceiver 306 is capable of simultaneous transmitting and receiving. That is, transceiver 306 can transmit an upstream signal into and receive a downstream signal from the same fiber, wherein the two signals are on two wavelengths, and wherein the fiber can be a single-mode or multi-mode fiber.

Transceiver 306 is further in communication with an ONU chip 302, through a transmission (TX) link and a receiving (RX) link. The TX link carries upstream data from ONU chip 302 to transceiver 306, and carries downstream data from transceiver 306 to ONU chip 302. ONU chip 302 performs the main ONU functions, such as extracting data designated for the local subscriber based on each packet's LLID and transmission scheduling for upstream data. Note that in one embodiment, ONU chip 302 includes the necessary buffer for storing downstream and upstream data, and can implement queue-management schemes based on pre-defined or user-configured service level agreements (SLAs). In addition, one or more light emitting diodes (LEDs) 310 which are coupled to ONU chip 302 indicate the status of GBIC ONU module 300.

Also included in GBIC ONU module 300 is a flash memory 304 which is coupled to ONU chip 302 through a Serial Peripheral Interface (SPI). Serial flash memory 304 stores the programs and the initial boot-up configurations, which are loaded by ONU chip 302 upon power-up. Note that the content within flash memory 304 can be updated by the OLT through an in-band control and management channel. Hence, the ONU can perform network management based on the information sent by the OLT.

On the local side of GBIC ONU module 300 is a standard GBIC connector 316, which provides serial communication channels with the local subscriber's switch. A serializer/deserializer (SERDES) 312 couples GBIC connector 316 to ONU chip 302, converts the parallel data from ONU chip 302 to serial data for GBIC connector 316, and vice versa. GBIC ONU module 300 further includes a power management module 314, which draws power from GBIC connector 316 and provides power for the rest of GBIC ONU module 300, including ONU chip 302.

In a further embodiment, ONU chip 302 can include SERDES 312, thereby further reducing the footprint of the ONU module. GBIC ONU module 300 can also include an Inter-Integrated Circuit (I2C) bus coupled between GBIC connector 316 and ONU chip 302. The I2C bus allows the local switch to send control and management information to ONU chip 302 and to manage the ONU module.

FIG. 4 illustrates an exemplary pluggable ONU module with an SFP form factor in accordance with an embodiment of the present invention. An SFP ONU module 400 includes a fiber connector 408 for coupling to an optical fiber on the plant side. An optical bi-directional transceiver 406 transmits optical signals to and receive signals from the optical fiber. Transceiver 406 is capable of simultaneous transmitting and receiving. In one embodiment, transceiver 406 is a pluggable module that can be easily plugged into or removed from SFP ONU module 400.

Transceiver 406 is further in communication with an ONU chip 402 through a TX link and an RX link. The TX link carries upstream data from ONU chip 402 to transceiver 406, and carries downstream data from transceiver 406 to ONU chip 402. One or more LEDs 410 are coupled to ONU chip 402 and indicate the status of SFP ONU module 400. Also included in SFP ONU module 400 is a flash memory 404 which is coupled to ONU chip 402 through an SPI interface.

On the local side of SFP ONU module 400 is a standard SFP connector 416, which provides serial communication channels with the local subscriber's switch. A SERDES 412 couples SFP connector 416 to ONU chip 402, converts the parallel data from ONU chip 402 to serial data for SFP connector 416, and vice versa. SFP ONU module 400 further includes a power management module 414, which draws power from SFP connector 416 and provides power for the rest of SFP ONU module 400, including ONU chip 402.

In one embodiment, ONU chip 402 can include SERDES 412, thereby further reducing the footprint of the ONU module. SFP ONU module 400 can also include an I2C bus coupled between SFP connector 416 and ONU chip 402. The I2C bus allows the local switch to send control and management information to ONU chip 402.

In further embodiments, the integrated circuits, such as the ONU chip, SERDES, flash memory, the power management modules, can be directly attached to the underlying printed circuit board (PCB) without individual packaging. That is, an IC die is attached directly to a PCB, and conductive wires are bonded to the IC connects and conductive regions on the PCB. The die is typically covered with a blob of epoxy.

Note that the GBIC, SFP, and XFP are not the only form factors applicable to the inventive pluggable ONU. A pluggable ONU generally can have any form factors, so long as its size allows the ONU to be plugged into the SPE. Particularly, the pluggable ONU can have a form factor which is substantially similar to any fiber-optical transceivers, such as XEN-PAK which conforms to the 10 GbE standard as laid down by the IEEE 802.3ae standard.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A small form factor, pluggable optical network unit (ONU), comprising:
   a bi-directional optical transceiver configured to transmit optical signals to and receive optical signals from an optical line terminal (OLT);
   an ONU chip coupled to the optical transceiver and configured to communicate with the OLT, through the optical transceiver;
   a pluggable interface coupled to the ONU chip and configured to electrically interface between the ONU chip and a piece of subscriber premise equipment (SPE), whereby the pluggable interface can be directly plugged into the SPE;
   an inter-integrated circuit (I2C) bus which is coupled to the ONU chip and the pluggable interface;
      wherein the ONU chip is configured to allow the SPE to manage the ONU through the I2C bus;
   a serializer/deserializer (SERDES) module which is coupled between the pluggable interface and the ONU chip, thereby facilitating serial communication through the pluggable interface;
   a power management module configured to provide power to the ONU chip and the optical transceiver, using power delivered from the SPE through the pluggable interface;
   wherein the optical transceiver, the ONU chip, the power management module, and the serial interface are contained in a small form factor enclosure, thereby allowing the pluggable ONU to be directly plugged into the SPE and providing an Ethernet Passive Optical Network (EPON) uplink to the SPE without requiring an separate power supply.

2. The ONU of claim 1, wherein the enclosure has a form factor that is substantially the same as a Gigabit Interface Converter (GBIC) transceiver; and
   wherein the pluggable interface is a GBIC interface which can be plugged into a GBIC port on the SPE.

3. The ONU of claim 1, wherein the enclosure has a form factor that is substantially the same as a small form factor pluggable (SFP) transceiver; and
   wherein the pluggable interface is a SFP interface which can be plugged into an SFP port on the SPE.

4. The ONU of claim 1, wherein the enclosure has a form factor that is substantially the same as a 10 Gigabit Small Form Factor Pluggable (XFP) transceiver; and
   wherein the pluggable interface is an XFP interface which can be plugged into an XFP port on the SPE.

5. The ONU of claim 1, wherein the ONU chip is configured to perform network management through an in-band management channel between the ONU and the OLT.

6. The ONU of claim 1, wherein the bidirectional optical transceiver is a pluggable transceiver and is configured to transmit optical signals into and receive optical signals from a multi-mode or a single-mode optical fiber.

7. The ONU of claim 1, wherein the ONU chip comprises a SERDES, thereby facilitating serial communication through the pluggable interface.

8. The ONU of claim 1, further comprising a printed circuit board (PCB); and
   wherein the ONU chip comprises a die directly attached on the PCB without conventional chip packaging.

9. An EPON-enabled switching system, comprising:
   a piece of subscriber premise equipment (SPE);
   a small form factor, pluggable ONU plugged into the SPE, the ONU comprising:
      a bi-directional optical transceiver configured to transmit optical signals to and receive optical signals from an OLT;
      an ONU chip coupled to the optical transceiver and configured to communicate with the OLT, through the optical transceiver;
      a pluggable interface coupled to the ONU chip and configured to electrically interface between the ONU chip and the SPE, whereby the pluggable interface can be directly plugged into the SPE;
   an inter-integrated circuit (I2C) bus which is coupled to the ONU chip and the pluggable interface;
      wherein the ONU chip is configured to allow the SPE to manage the ONU through the I2C bus;
   a serializer/deserializer (SERDES) module which is coupled between the pluggable interface and the ONU chip, thereby facilitating serial communication through the pluggable interface;
   a power management module configured to provide power to the ONU chip and the optical transceiver, using power delivered from the SPE through the pluggable interface;
      wherein the optical transceiver, the ONU chip, the power management module, and the serial interface are contained in a small form factor enclosure, thereby allowing the pluggable ONU to be directly plugged into the SPE and providing an EPON uplink to the SPE without requiring a separate power supply.

10. The switching system of claim 9, wherein the enclosure has a form factor that is substantially the same as a Gigabit Interface Converter (GBIC) transceiver; and
    wherein the pluggable interface is a GBIC interface which can be plugged into a GBIC port on the SPE.

11. The switching system of claim 9, wherein the enclosure has a form factor that is substantially the same as a small form factor pluggable (SFP) transceiver; and
    wherein the pluggable interface is a SFP interface which can be plugged into an SFP port on the SPE.

12. The switching system of claim 9, wherein the enclosure has a form factor that is substantially the same as a 10 Gigabit Small Form Factor Pluggable (XFP) transceiver; and
    wherein the pluggable interface is an XFP interface which can be plugged into an XFP port on the SPE.

13. The switching system of claim 9, wherein the ONU chip is configured to perform network management through an in-band management channel between the ONU and the OLT.

14. The switching system of claim 9, wherein the bidirectional optical transceiver is a pluggable transceiver and is configured to transmit optical signals into and receive optical signals from a multi-mode or a single-mode optical fiber.

15. The switching system of claim 9, further comprising a printed circuit board (PCB); and
    wherein the ONU chip comprises a die directly attached on the PCB without conventional chip packaging.

16. A GBIC-compliant pluggable optical network unit (ONU) module, comprising: a bi-directional optical transceiver configured to communicate to an optical line terminal (OLT); an ONU chip configured to extract downstream traffic and schedule upstream traffic, wherein the ONU chip is coupled to the bi-directional optical transceiver; one or more LEDs coupled to the ONU chip and configured to indicate the ONU module's status; a pluggable interface coupled to the ONU chip and configured to electrically interface between the ONU chip and a piece of subscriber premise equipment (SPE), whereby the pluggable interface can be directly plugged into the SPE; a flash memory coupled to the ONU chip via a serial bus; a standard GBIC connector coupled to the ONU chip; an inter integrated-circuit (I2C) bus coupled between the standard GBIC connector and the ONU chip; wherein the ONU chip is configured to allow the SPE to manage the ONU through the I2C bus; a serializer/deserializer (SERDES) module which is coupled between the pluggable interface and the ONU chip, thereby facilitating serial communication through the pluggable interface; and a power management module coupled between the standard GBIC connector and the ONU chip; wherein the ONU module is contained in an enclosure which substantially complies with a standard GBIC form factor.

17. A small form factor pluggable (SFP)-compliant optical network unit (ONU) module, comprising: a bi-directional optical transceiver configured to communicate to an optical line terminal (OLT); an ONU chip configured to extract downstream traffic and schedule upstream traffic, wherein the ONU chip is coupled to the bi-directional optical transceiver; one or more LEDs coupled to the ONU chip and configured to indicate the ONU module's status; a pluggable interface coupled to the ONU chip and configured to electrically interface between the ONU chip and a piece of subscriber premise equipment (SPE), whereby the pluggable interface can be directly plugged into the SPE; a flash memory coupled to the ONU chip via a serial bus; a standard SFP connector coupled to the ONU chip; an inter integrated-circuit (I2C) bus coupled between the standard SFP connector and the ONU chip; wherein the ONU chip is configured to allow the SPE to manage the ONU through the I2C bus; a serializer/deserializer (SERDES) module which is coupled between the pluggable interface and the ONU chip, thereby facilitating serial communication through the pluggable interface; and a power management module coupled between the standard SFP connector and the ONU chip; wherein the ONU module is contained in an enclosure which substantially complies with a standard SFP form factor.

* * * * *